United States Patent
Xiao

(10) Patent No.: US 11,129,409 B2
(45) Date of Patent: Sep. 28, 2021

(54) ATOMIZER WITH E-LIQUID CHAMBER ISOLATED THEREOF AND SUCTION DEVICE USING SAME

(71) Applicant: SHENZHEN UWELL TECHNOLOGY CO., LTD., Shenzhen (CN)

(72) Inventor: Yucheng Xiao, Shenzhen (CN)

(73) Assignee: SHENZHEN UWELL TECHNOLOGY CO., LTD., Shenzhen (CN)

( * ) Notice: Subject to any disclaimer, the term of this patent is extended or adjusted under 35 U.S.C. 154(b) by 335 days.

(21) Appl. No.: 16/353,070

(22) Filed: Mar. 14, 2019

(65) Prior Publication Data

US 2020/0275712 A1 Sep. 3, 2020

(30) Foreign Application Priority Data

Feb. 28, 2019 (CN) .......................... 201910151876.9

(51) Int. Cl.
   *A24F 13/00* (2006.01)
   *A24F 7/00* (2006.01)
   *F16J 15/10* (2006.01)

(52) U.S. Cl.
   CPC ............... *A24F 7/00* (2013.01); *F16J 15/104* (2013.01)

(58) Field of Classification Search
   CPC ....................................................... A24F 47/00
   USPC ................................................. 131/328–329
   See application file for complete search history.

(56) References Cited

U.S. PATENT DOCUMENTS

2017/0156408 A1* 6/2017 Li ........................... H05B 3/16

* cited by examiner

*Primary Examiner* — Phuong K Dinh

(57) ABSTRACT

An atomizer with an e-liquid chamber isolated thereof and a suction device using same includes a mouthpiece, a housing and an atomization core with an e-liquid hole thereof. The e-liquid chamber is formed inside the housing and surrounded around the atomization core, and an e-liquid baffle formed between the e-liquid chamber and the atomization core inside the housing. The atomization core or the e-liquid baffle with its installation position within the housing can move in the housing so that the e-liquid baffle can be blocked or staggered from the e-liquid guiding hole. When the e-liquid guiding hole is shielded by the e-liquid baffle, the e-liquid guiding hole disconnects to the e-liquid chamber so that the atomizer is in its initial state. When the e-liquid guiding hole is staggered from the e-liquid baffle, the e-liquid guiding hole is connected with the e-liquid chamber so that the atomizer is in its usage state.

18 Claims, 12 Drawing Sheets

ATOMIZER WITH E-LIQUID CHAMBER ISOLATED THEREOF AND SUCTION DEVICE USING SAME

BACKGROUND

1. Technical Field

The present disclosure generally relates to electronic cigarettes field, and especially relates to an atomizer with an e-liquid chamber isolated thereof and a suction device using the same.

2. Description of Related Art

The electronic heating suction device with a pre-filling e-liquid atomizer is more and more favored. Such kind of atomizer in the market is obtained by directly connecting its atomization core with its e-liquid chamber so that the atomization core is immersed in soot e-liquid. However, such structure has some disadvantages: for example, e-liquid within the e-liquid chamber will leakage out of the atomization core during transporting the suction device under change conditions such as turbulence or external temperature or air pressure, thereby affecting user's experience due to e-liquid leakage before non-using some atomizers.

SUMMARY

The technical problems to be solved: in view of the shortcomings of the related art, the present disclosure relates to an atomizer with an e-liquid chamber isolated thereof and a suction device using same which can allow for transportation without e-liquid leakage when the atomizer is in its initial state, in this way, when needing to use the suction device, it is only to move away the atomization core or the e-liquid baffle to connect the atomization core with the e-liquid chamber, thereby avoiding the phenomenon of e-liquid leakage caused by the suction device after its transportation is produced to further affect user's experience.

The technical solution adopted for solving technical problems of the present disclosure is:

an atomizer with an e-liquid chamber isolated thereof includes a housing, a mouthpiece mounted on the upper of the housing, an atomization core received in the housing and including an e-liquid guiding hole thereon, both the housing and the mouthpiece connected to the atomization core to cooperatively form a gas passage thereamong, an e-liquid chamber formed inside the housing and surrounded around the atomization core, and an e-liquid baffle formed between the e-liquid chamber and the atomization core inside the housing. The atomization core or the e-liquid baffle with its installation position within the housing can move in the housing so that the e-liquid baffle can be blocked or staggered from the e-liquid guiding hole, when the e-liquid guiding hole is shielded by the e-liquid baffle, the e-liquid guiding hole is disconnected from the e-liquid chamber and the atomizer is in its initial state; while when the e-liquid guiding hole is staggered from the e-liquid baffle, the e-liquid guiding hole is connected with the e-liquid chamber so that the atomizer is in its usage state.

Wherein the atomizer is changed from the initial state to the usage state after the atomization core with its installation position within the housing is axially moved downward.

Wherein the housing includes a hollow-shaped mounting seat formed on the upper thereof axially towards the housing, and a first sealing cover formed on the bottom thereof to form the e-liquid baffle and including a sealing sleeve extending into the e-liquid chamber, with an e-liquid inlet on a sidewall of the sealing sleeve, the atomization core received in the mounting seat and the sealing sleeve and then slid in the mounting seat and the sealing sleeve. The e-liquid inlet is staggered from the e-liquid guiding hole when the atomizer is in the initial state, and the e-liquid inlet is aligned and connected with the e-liquid guiding hole so that the atomizer can change to the usage state after the atomizer is moved in the mounting seat and the sealing sleeve downwardly.

Wherein a pressing block is formed on the mouthpiece to resist against the upper end of the atomization core, a first recess and a second recess downwardly formed on two ends of the mouthpiece which are sleeved around two sides of the housing in turn, and a first block and a second block respectively formed on the outer wall of the housing in turn. In the initial state, a first moving chamber is arranged between the pressing block and the upper of the housing, and the second recess is engaged with the first block. When the atomization core moving downward to the usage state, the pressing block moving downward to resist against the bottom of the first moving chamber, the second recess moving downward to snap with the second block, and the first recess moving downward to snap with the first block.

Wherein the atomization core includes an insulating gasket formed on the bottom of the atomization core and an electrode passing through the insulating gasket; a base formed on the bottom of the housing and positioned under the first sealing cover, with a first through-hole axially being formed thereof, the bottom of the atomization core and the insulating gasket extending into the base, an air inlet channel formed between the base and the housing to connect with the gas passage from the bottom of the atomization core; the atomization core tightly fixed with the mounting seat and the sealing sleeve, a first sealing ring formed on a connection end of the upper of the atomization core and the mounting seat, a second sealing ring sleeved around the outer of the insulating gasket and moved downward to the first through-hole of the base to tightly connect with the base.

Wherein the atomizer is changed from the initial state to the usage state after the atomization core with its installation position within the housing is axially moved upward.

Wherein the housing includes a hollow-shaped mounting seat formed on the upper thereof axially towards the housing, and a second sealing cover formed on the bottom thereof to form the e-liquid baffle and including a second through-hole axially passing therethrough, the atomization core received in the mounting seat and the second through-hole and then slid in the mounting seat and the second through-hole; the e-liquid guiding hole is shielded by the inner wall of the second through-hole when the atomizer is in the initial state, the inner wall of the second through-hole and the e-liquid guiding hole are staggered up and down so that the atomizer can change to the usage state after the atomization core is moved in the mounting seat and the second sealing cover upwardly.

Wherein a sealing gasket is sleeved around the atomization core and positioned above the e-liquid guiding hole, and its bottom is extended into the second through-hole when the atomizer is on the initial state so that the e-liquid guiding hole is disconnected from the e-liquid chamber by the bottom of the sealing gasket and the inner wall of the second through-hole; the sealing gasket moved upward to separate from the second through-hole after the atomization core moved in the mounting seat and the second sealing cover upwardly, and the e-liquid guiding hole moved upward to the top of the second through-hole to connect the e-liquid guiding hole with the e-liquid chamber and then the atomizer changed to the usage state.

Wherein an insulating cover is formed on the bottom of the housing and positioned under the second sealing cover, and includes a supporting seat and a post outwardly protruding adjacent to the second sealing cover, the second sealing cover including a second moving chamber formed adjacent to the insulating cover and arranged outside the second through-hole; the post extending into the second chamber to axially move therein, and the supporting seat resisted against the bottom of the atomization core and axially moving in the second through-hole; the supporting seat including a third through-hole formed in the middle thereof to pass through the insulating cover, and a first annular groove and a first electrode hole formed outside the third through-hole for the electrode passing therethrough, the third through-hole connected to the gas passage from the bottom of the atomization core, the atomization core including a frame defining the e-liquid guiding hole formed on a sidewall thereof, and an installing ring formed on the bottom thereof to insert into the first annular groove and then resist against the bottom of the first annular groove; a third sealing ring sleeved around the top of the frame to seal the mounting seat, and a fourth sealing ring sleeved around the bottom of the e-liquid guiding hole to tightly engage with the second through-hole.

Wherein the atomizer is changed from the initial state to the usage state after the e-liquid baffle with its installation position within the housing is axially moved upward.

Wherein the housing includes a hollow-shaped mounting seat formed on the upper thereof axially towards the housing, and an e-liquid baffle frame formed thereof to form the e-liquid baffle and including a sleeve and a pin formed on the bottom of the sleeve, a third sealing cover formed on the bottom of the housing to connect with the bottom of the atomization core and including a fourth through-hole axially passing therethrough and connecting with the gas passage from the bottom of the atomization core, and a moving hole formed outside the fourth through-hole, the pin inserted into the moving hole to snap with the moving hole and the atomization core received in the mounting seat and the sleeve so that the sleeve can move relative to the atomization core and the pin can move in the moving hole; the e-liquid hole shielded by the sleeve when the atomizer is in the initial state, while the sleeve and the e-liquid guiding hole are staggered up and down so that the atomizer can change to the usage state after the sleeve is moved in the e-liquid chamber upwardly.

Wherein the third sealing cover includes a second annular groove formed on the inner wall of the fourth through-hole adjacent to the e-liquid chamber, and the atomization core includes a frame defining an installing ring formed on the bottom thereof and the e-liquid guiding hole formed on a sidewall thereof, the installing ring inserted into the second annular groove and then resisted against the bottom of the second annular groove, the third sealing cover including a second electrode hole formed on the outer of the fourth through-hole for the electrode passing therethrough; a fifth sealing ring sleeved around the top of the frame to seal the mounting seat, and a sixth sealing ring and a seventh sealing ring respectively sleeved around the top and the bottom of the e-liquid guiding hole to tightly engage with the inner wall of the sleeve, correspondingly.

A suction device according to an exemplary embodiment of the present disclosure includes an atomizer with an e-liquid chamber isolated thereof, and a battery rod connected to the bottom of the atomizer. The atomizer with an e-liquid chamber isolated thereof includes a housing, a mouthpiece mounted on the upper of the housing, an atomization core received in the housing and including an e-liquid guiding hole thereon, both the housing and the mouthpiece connected to the atomization core to cooperatively form a gas passage thereamong, an e-liquid chamber formed inside the housing and surrounded around the atomization core, and an e-liquid baffle formed between the e-liquid chamber and the atomization core inside the housing. The atomization core or the e-liquid baffle with its installation position within the housing can move in the housing so that the e-liquid baffle can be blocked or staggered from the e-liquid guiding hole, when the e-liquid guiding hole is shielded by the e-liquid baffle, the e-liquid guiding hole is disconnected from the e-liquid chamber and the atomizer is in its initial state; while when the e-liquid guiding hole is staggered from the e-liquid baffle, the e-liquid guiding hole is connected with the e-liquid chamber so that the atomizer is in its usage state.

Wherein the housing includes a hollow-shaped mounting seat formed on the upper thereof axially towards the housing, and a first sealing cover formed on the bottom thereof to form the e-liquid baffle and including a sealing sleeve extending into the housing, with an e-liquid inlet on a sidewall of the sealing sleeve, the atomization core received in the mounting seat and the sealing sleeve and then slid in the mounting seat and the sealing sleeve. The e-liquid inlet is staggered from the e-liquid guiding hole when the atomizer is in the initial state, the e-liquid inlet aligned and connected with the e-liquid guiding hole so that the atomizer can change to the usage state after the atomizer is moved in the mounting seat and the sealing sleeve downwardly: a pressing block formed on the mouthpiece to resist against the upper end of the atomization core, a first recess and a second recess downwardly formed on two ends of the mouthpiece which are sleeved around two sides of the housing in turn, and a first block and a second block respectively formed on the outer wall of the housing in turn; in the initial state, a first moving chamber arranged between the pressing block and the upper of the housing and the second recess engaged with the first block; when the atomization core moving downward to the usage state, the pressing block moving downward to resist against the bottom of the first moving chamber, the second recess moving downward to snap with the second block, and the first recess moving downward to snap with the first block.

Wherein the atomization core includes an insulating gasket formed on the bottom of the atomization core and an electrode passing through the insulating gasket; a base formed on the bottom of the housing and positioned under the first sealing cover, with a first through-hole axially being formed thereof, the bottom of the atomization core and the insulating gasket extending into the base, an air inlet channel formed between the base and the housing to connect with the gas passage from the bottom of the atomization core; the atomization core tightly fixed with the mounting seat and the sealing sleeve, a first sealing ring formed on a connection end of the upper of the atomization core and the mounting seat, a second sealing ring sleeved around the outer of the insulating gasket and moved downward to the first through-hole of the base to tightly connect with the base.

Wherein the atomizer is changed from the initial state to the usage state after the atomization core with its installation position within the housing is axially moved upward: the housing including a hollow-shaped mounting seat formed on the upper thereof axially towards the housing, and a second sealing cover formed on the bottom thereof to form the e-liquid baffle and including a second through-hole axially passing therethrough, the atomization core received in the mounting seat and the second through-hole and then slid in the mounting seat and the second through-hole; the e-liquid guiding hole shielded by the inner wall of the second through-hole when the atomizer is in the initial state, the inner wall of the second through-hole and the e-liquid guiding hole staggered up and down so that the atomizer can change to the usage state after the atomization core is moved in the mounting seat and the second sealing cover upwardly: a sealing gasket sleeved around the atomization core and positioned above the e-liquid guiding hole and the bottom of the sealing gasket extending into the second through-hole when the atomizer in the initial state so that the e-liquid guiding hole is disconnected from the e-liquid chamber by the bottom of the sealing gasket and the inner wall of the second through-hole; the sealing gasket moved upward to separate from the second through-hole after the atomization core moved in the mounting seat and the second sealing cover upwardly, and the e-liquid guiding hole moved upward to the top of the second through-hole to connect the e-liquid guiding hole with the e-liquid chamber and then the atomizer changed to the usage state.

Wherein the atomizer is changed from the initial state to the usage state after the atomization core with its installation position within the housing is axially moved upward: the housing including a hollow-shaped mounting seat formed on the upper thereof axially towards the housing, and a second sealing cover formed on the bottom thereof to form the e-liquid baffle and including a second through-hole axially passing therethrough, the atomization core received in the mounting seat and the second through-hole and then slid in the mounting seat and the second through-hole; the e-liquid guiding hole shielded by the inner wall of the second through-hole when the atomizer is in the initial state, the inner wall of the second through-hole and the e-liquid guiding hole staggered up and down so that the atomizer can change to the usage state after the atomization core is moved in the mounting seat and the second sealing cover upwardly; an insulating cover formed on the bottom of the housing and positioned below the second sealing cover, and including a supporting seat and a post protruding outwardly adjacent to the second sealing cover, the second sealing cover including a second moving chamber formed adjacent to the insulating cover and arranged outside the second through-hole; the post extending into the second chamber to axially move therein, and the supporting seat resisted against the bottom of the atomization core and axially moving in the second through-hole; the supporting seat including a third through-hole formed in the middle thereof to pass through the insulating cover, and a first annular groove and a first electrode hole formed outside the third through-hole for the electrode passing therethrough, the third through-hole connected to the gas passage from the bottom of the atomization core, the atomization core including a frame defining the e-liquid guiding hole formed on a sidewall thereof, and an installing ring formed on the bottom thereof to insert into the first annular groove and then resist against the bottom of the first annular groove; a third sealing ring sleeved around the top of the frame to seal the mounting seat, and a fourth sealing ring sleeved around the bottom of the e-liquid guiding hole to tightly engage with the second through-hole.

Wherein the atomizer is changed from the initial state to the usage state after the e-liquid baffle with its installation position within the housing is axially moved upward; the housing including a hollow-shaped mounting seat formed on the upper thereof axially towards the housing, and an e-liquid baffle frame formed thereof to form the e-liquid baffle and including a sleeve and a pin formed on the bottom of the sleeve, a third sealing cover formed on the bottom of the housing to connect with the bottom of the atomization core and including a fourth through-hole axially passing therethrough and connecting with the gas passage from the bottom of the atomization core, and a moving hole formed outside the fourth through-hole, the pin inserted into the moving hole to snap with the moving hole and the atomization core received in the mounting seat and the sleeve so that the sleeve can move relative to the atomization core and the pin can move in the moving hole; the e-liquid hole shielded by the sleeve when the atomizer is in the initial state, while the sleeve and the e-liquid guiding hole staggered up and down so that the atomizer can change to the usage state after the sleeve moved in the e-liquid chamber upwardly.

Wherein the third sealing cover includes a second annular groove formed on the inner wall of the fourth through-hole adjacent to the e-liquid chamber, and the atomization core includes a frame defining an installing ring formed on the bottom thereof and the e-liquid guiding hole formed on a sidewall thereof, the installing ring inserting into the second annular groove and then resisted against the bottom of the second annular groove, the third sealing cover including a second electrode hole formed on the outer of the fourth through-hole for the electrode passing therethrough; a fifth sealing ring sleeved around the top of the frame to seal the mounting seat, and a sixth sealing ring and a seventh sealing ring respectively sleeved around the top and the bottom of the e-liquid guiding hole to tightly engage with the inner wall of the sleeve, correspondingly.

The present disclosure provides the advantages as below.

The structure of the present disclosure is provided that the atomization core or the e-liquid baffle with its installation position within the housing can move in the housing so that the e-liquid baffle can be blocked or staggered from the e-liquid guiding hole. When the e-liquid guiding hole is shielded by the e-liquid baffle, the e-liquid guiding hole is disconnected to the e-liquid chamber and the atomizer is in its initial state. When the e-liquid guiding hole is staggered from the e-liquid baffle, the e-liquid guiding hole is connected with the e-liquid chamber so that the atomizer is in its usage state. In sum, when the atomizer is in the initial state, the suction device can allow for transportation without e-liquid leakage when the atomizer is in its initial state, in this way, when needing to use the suction device, it is only to move away the atomization core or the e-liquid baffle to connect the atomization core with the e-liquid chamber, thereby avoiding the phenomenon of e-liquid leakage caused by the suction device after its transportation is produced to further affect user's experience.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
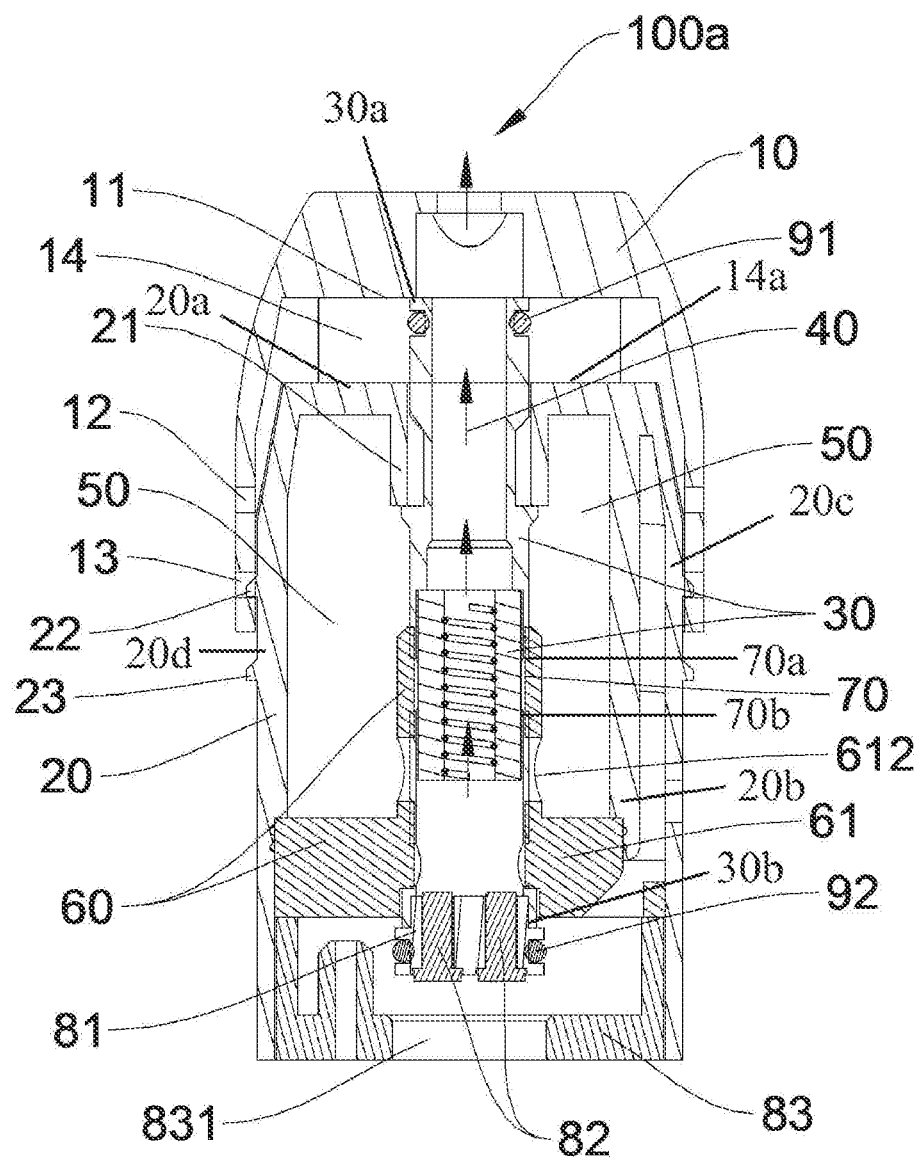
FIG. 1 is a cross-sectional schematic view of the atomizer with an e-liquid chamber isolated thereof in accordance with a first exemplary embodiment, shown the atomizer in its initial state.

The disclosure is illustrated by way of example and not by way of limitation in the figures of the accompanying drawings, in which like reference numerals indicate similar elements.

Figure 4:
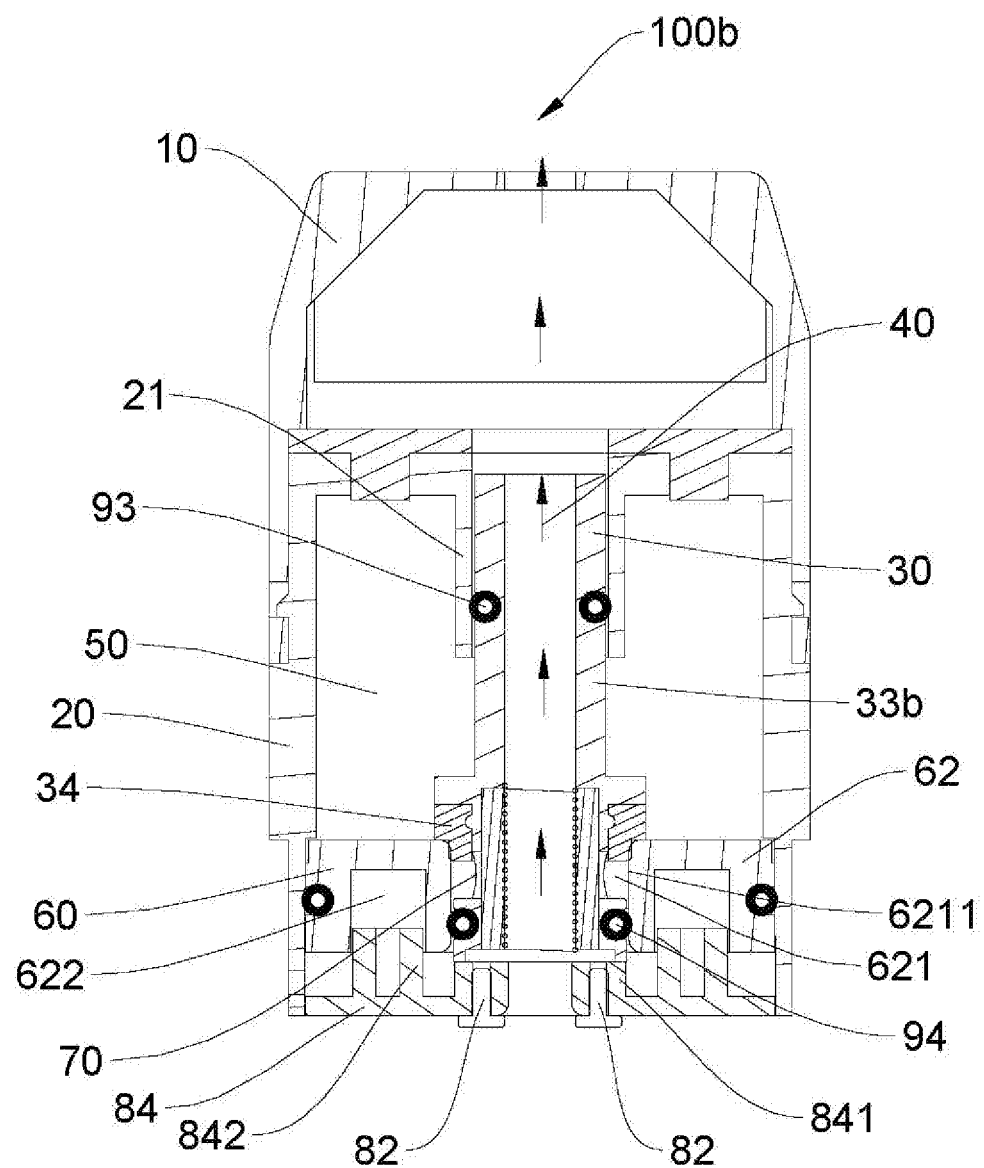
FIG. 4 is a cross-sectional schematic view of the atomizer with an e-liquid chamber isolated thereof in accordance with a second exemplary embodiment, shown the atomizer in its initial state.
Figure 9:
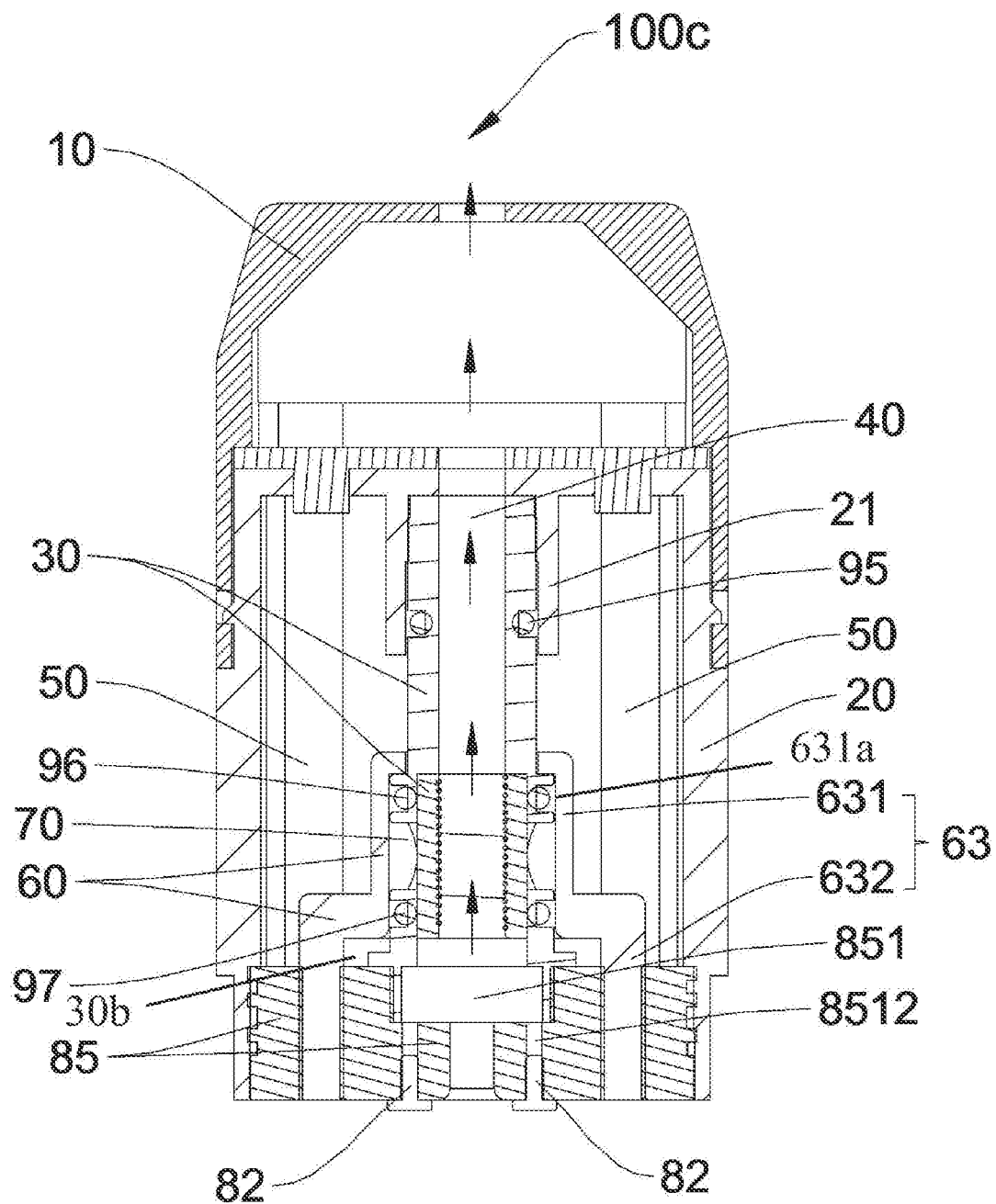
FIG. 9 is a cross-sectional schematic view of the atomizer with an e-liquid chamber isolated thereof in accordance with a third exemplary embodiment, shown the atomizer in its initial state.

Referring to FIG. 1, FIG. 4 and FIG. 9, an atomizer 100a, 100b, 100c isolated an e-liquid chamber 50 thereof includes a housing 20, a mouthpiece 10 mounted on the upper of the housing 20 and an atomization core 30 received in the housing 20. Both the mouthpiece 10 and the housing 20 are connected to the atomization core 30 to cooperatively form a gas passage 40 thereamong. The atomization core 30 includes an organic member 31 formed therein and a heating member 32. In an exemplary embodiment of the present disclosure, the organic member 31 can be organic cotton or other elements, the heating member 32 can be a heating wire or a heating pipe, and the gas passage 40 is configured to discharge the fog after atomization.

An e-liquid chamber 50 is formed inside the housing 20 and surrounded around the atomization core 30, and an e-liquid baffle 60 is formed between the e-liquid chamber 50 and the atomization core 30 inside the housing 20. The atomization core 30 includes an e-liquid guiding hole 70 formed thereon. The e-liquid chamber 50 is configured to inject e-liquid into the atomizer 100a, 100b, 100c and store the e-liquid therein.

The atomization core 30 or the e-liquid baffle 60 with an installation position within the housing 20 can move in the housing 20 so that the e-liquid baffle 60 can be blocked or staggered from the e-liquid guiding hole 70. When the e-liquid guiding hole 70 is shielded by the e-liquid baffle 60, the e-liquid guiding hole 70 is disconnected from the e-liquid chamber 50 and the atomizer 100a, 100b, 100c is in its initial state. While, when the e-liquid guiding hole 70 is staggered from the e-liquid baffle 60, the e-liquid guiding hole 70 is connected with the e-liquid chamber 50 so that the atomizer 100a, 100b, 100c is in its usage state.

That is to say, in the initial state, because the e-liquid guiding hole 70 is shielded by the e-liquid baffle 60, the connection between the e-liquid guiding hole 70 and the e-liquid chamber 50 is cut off, thereby the atomization core 30 is isolated from the e-liquid chamber 50. At this time, the e-liquid in the e-liquid chamber 50 can't enter the organic member 31 of the atomization core 30 so that it can't supply the e-liquid for the atomization core 30. So, a suction device 300 (shown in FIG. 14) with the atomizer 100a, 100b, 100c can allow for transportation without e-liquid leakage when the atomizer 100a, 100b, 100c is in its initial state. In this way, when needing to use the suction device 300, it is only to move away the atomization core 30 or the e-liquid baffle 60 to connect the atomization core 30 with the e-liquid chamber 50, thereby avoiding the phenomenon of e-liquid leakage caused by the suction device 300 after its transportation is produced to further affect user's experience.

And, in the usage state, because the e-liquid guiding hole 70 is staggered from the e-liquid baffle 60, the e-liquid guiding hole 70 is connected with the e-liquid chamber 50 so that the atomization core 30 is connected to the e-liquid chamber 50. At this time, the e-liquid in the e-liquid chamber 50 can enter organic member 31 of the atomization core 30 by the e-liquid guiding hole 70 and then can supply the e-liquid for the atomization core 30 so that the atomization core 30 can normally atomize the e-liquid. That is, when needing to use the suction device 300, it is only to move away the atomization core 30 or the e-liquid baffle 60 to connect the atomization core 30 with the e-liquid chamber 50, thereby its operation is quick and convenient.

The e-liquid baffle 60 of the present disclosure is fixed, and the installation position of the atomization core 30 in the housing 20 is movable. Or, The atomization core 30 of the present disclosure is fixed, and the installation position of the e-liquid baffle 60 in the housing 20 is movable. In this way, the e-liquid guiding hole 70 can be shielded by the e-liquid baffle 60 or staggered from the e-liquid baffle 60 so that the atomization core 30 is in the initial state of separating the atomization core 30 from the e-liquid chamber 50 or in the usage state of connecting the atomization core 30 with the e-liquid chamber 50.

Figure 2:
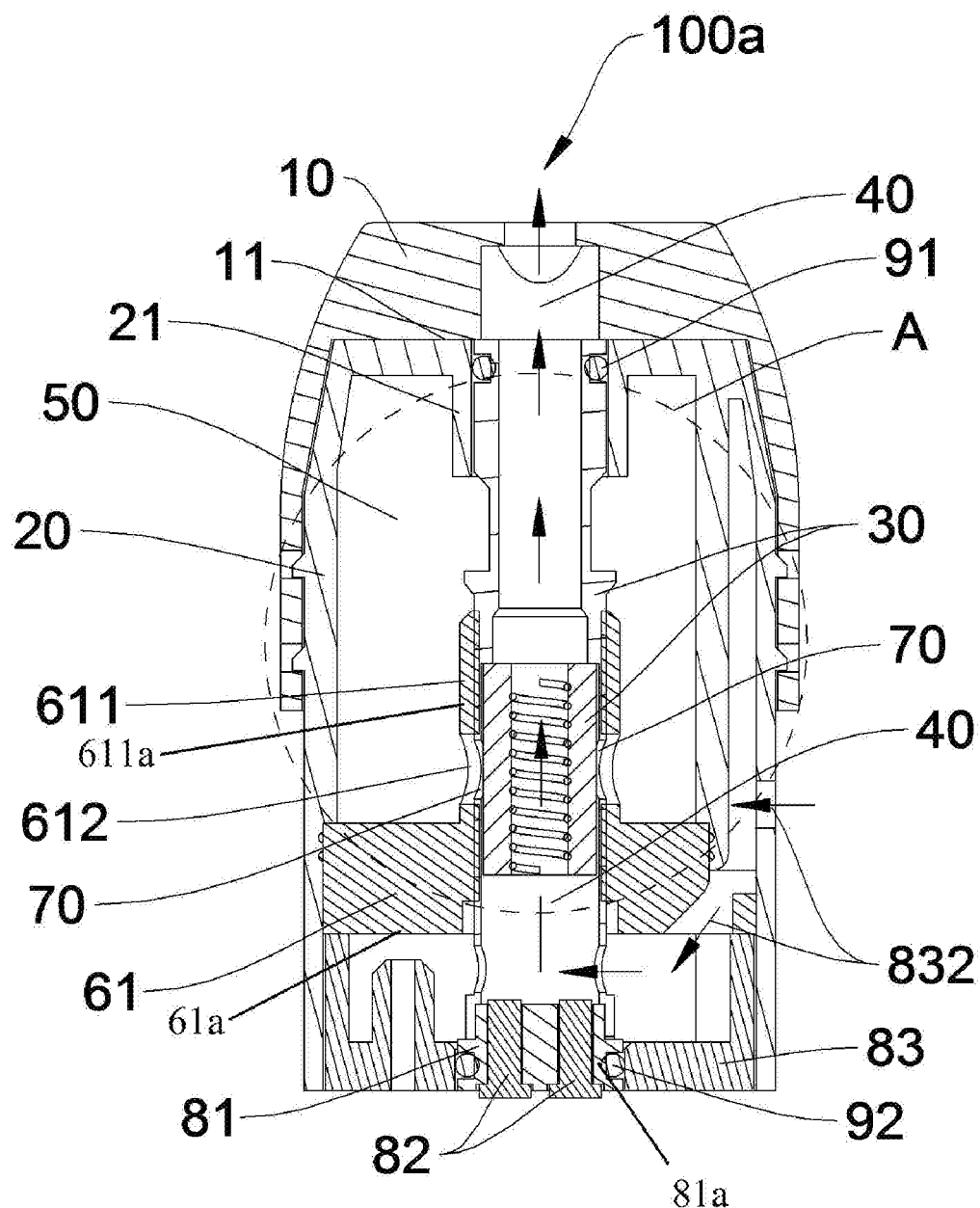
FIG. 2 is a cross-sectional schematic view of the atomizer of FIG. 1, shown the atomizer in its usage state.
Figure 3:
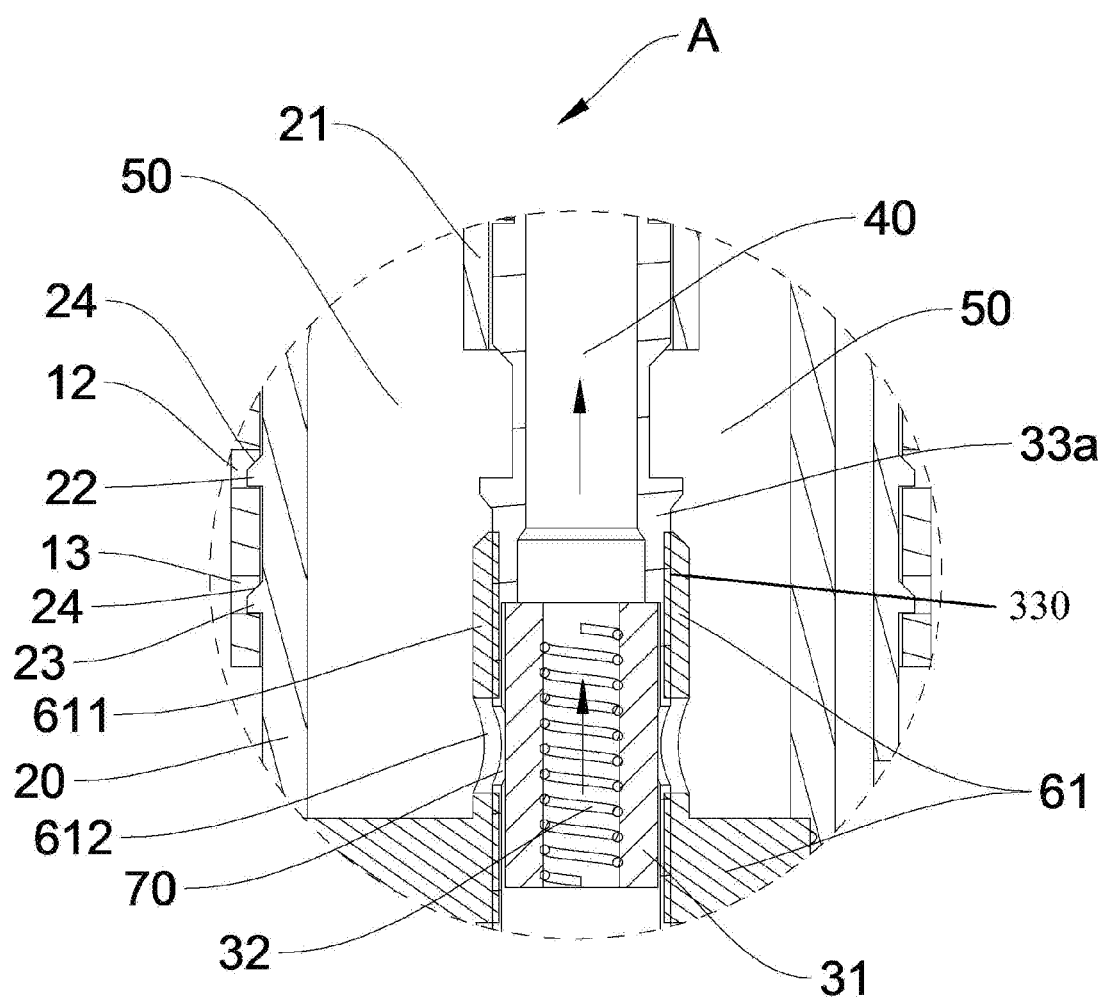
FIG. 3 is an enlarged, schematic view of circle A of FIG. 2.

Referring to FIGS. 1-3, in a first exemplary embodiment of the present disclosure, the atomization core 30 is changed from the initial state to the usage state after the atomization core 30 with its installation position within the housing 20 is axially moved downward. That is to say, the e-liquid baffle 60 of the atomizer 100a is fixed, the installation position of the atomization core 30 in the housing 20 is movable, and the atomizer 100a is changed from the initial state to the usage state after the atomization core 30 is axially moved downwardly.

Specifically, the housing 20 includes a hollow-shaped mounting seat 21 formed on the upper 20a thereof axially towards the housing 20, and a first sealing cover 61 formed on the bottom 20b hereof to form the e-liquid baffle 60. The first sealing cover 61 is configured to seal the bottom 20b of the housing 20 to form the e-liquid baffle 60. The first sealing cover 61 includes a sealing sleeve 611 extending into the e-liquid chamber 50 to shield a channel between the e-liquid chamber 50 and the e-liquid guiding hole 70. The first sealing cover 61 further includes an e-liquid inlet 612 formed on a sidewall 611a thereof. The atomization core 30 is received in the mounting seat 21 and the sealing sleeve 611 to slide therein.

When the atomizer 100a is in the initial state, the e-liquid inlet 612 of the sealing sleeve 611 is staggered from the e-liquid guiding hole 70 of the atomization core 30. Referring to FIG. 1, the sealing sleeve 611 is sleeved around the outer wall of the atomization core 30 and the e-liquid inlet 612 of the sealing sleeve 611 is positioned below the bottom of the e-liquid guiding hole 70 so that the e-liquid guiding hole 70 is shielded by walls of the sealing sleeve 611.

The e-liquid inlet 612 is aligned and connected with the e-liquid guiding hole 70 so that the atomization core 30 can change to the usage state after the atomization core 30 is moved in the mounting seat 21 and the sealing sleeve 611 downwardly. Referring to FIG. 2 and FIG. 3, under external forces, the atomization core 30 is moved downwardly relative to the sealing sleeve 611 until the e-liquid inlet 612 is aligned with the e-liquid guiding hole 70. At this time, the e-liquid chamber 50 is connected with the e-liquid guiding hole 70 for supplying e-liquid to the atomization core 30, thereby the normal atomization of the atomization core 30 can be ensured.

Preferably, a pressing block 11 is formed on the mouthpiece 10 to resist against the upper end 30a of the atomization core 30. A first recess 12 and a second recess 13 are downwardly formed on two ends of the mouthpiece 10 which are sleeved around two sides 20c of the housing 20 in turn, and a first block 22 and a second block 23 are respectively formed on the outer wall 20d of the housing 20 in turn.

When the atomizer 100a is in the initial state, a first moving chamber 14 is arranged between the pressing block 11 and the upper 20a of the housing 20 and the second recess 13 is engaged with the first block 22. When the atomization core 30 moves downward to the usage state, the pressing block 11 is also moved downward to resist against the bottom 14a of the first moving chamber 14, the second recess 13 is moved downward to snap with the second block 23, and the first recess 12 is moved downward to snap with the first block 22. That is, the atomizer 100a is in the initial state. Referring to FIG. 1, the upper end 30a of the atomization core 30 is higher than the upper 20a of the housing 20 and the pressing block 11 resists against the upper end 30a of the atomization core 30. In this way, the second recess 13 is clamped with the first block 22 to prevent the mouthpiece 10 from falling down during the non-usage state such as transportation. When the atomizer 100a is in the usage state, the mouthpiece 10 is pressed down to drive the pressing block 11 to move down in the first moving chamber 14 to push down the atomization core 30 until the pressing block 11 is connected with the upper 20a of the housing 20. At this time, the atomization core 30 is connected with the e-liquid chamber 50. Meanwhile, during the process of moving down, the second recess 13 is detached from the first block 22 and then downwardly slid into the second block 23 to clamp together with the second block 23. While, the first recess 12 is snapped with the first block 22. In this way, it not only can tightly fix the mouthpiece 10, but also can limit movement of the mouthpiece 10.

Furthermore, referring to FIG. 3, each of the first block 22 and the second block 23 includes a guiding block 24 formed on a corresponding top thereof for conveniently guiding the mouthpiece 10 to slide downwardly.

Referring to FIG. 1 and FIG. 2, the atomization core 30 includes an insulating gasket 81 formed on the bottom 30b of the atomization core 30 and an electrode 82 passing through the insulating gasket 81 and electrically connecting to a battery member. The insulating gasket 81 is configured to isolate the electrode 82.

A base 83 is formed on the bottom 20b of the housing 20 and positioned below the bottom 61a of the first sealing cover 61 and includes a first through-hole 831 axially being formed thereof, with the bottom 30b of the atomization core 30 and the insulating gasket 81 extending into the base 83. An air inlet channel 832 is formed between the base 83 and the housing 20 to connect with the gas passage 40 from the bottom 30b of the atomization core 30. The base 83 is configured to install the insulating gasket 81 and the electrode 82 in the usage state and air inflow of the atomization core 30.

The atomization core 30 is tightly fixed with the mounting seat 21 and the sealing sleeve 611, and a first sealing ring 91 is formed on a connection end of the upper 30a of the atomization core 30 and the mounting seat 21. A second sealing ring 92 is sleeved around the outer 81a of the insulating gasket 81 and moved downward to the first through-hole 831 of the base 83 to tightly connect with the base 83. Both the first sealing ring 91 and the first sealing cover 61 are configured to seal the e-liquid chamber 50, and the second sealing ring 92 is configured to prevent the e-liquid at the bottom 30b of the atomization core 30 from leaking out. Furthermore, an installation groove is formed on the atomization core 30 at the installation position of the first sealing ring 91.

Referring to FIG. 3, the atomization core 30 of the present disclosure includes a frame 33a for receiving the organic member 31 and the heating member 32 therein. The e-liquid guiding hole 70 is positioned on a sidewall 330 of the frame 33a. When the atomizer 100a is in the usage state, the e-liquid inlet 612 of the sealing sleeve 611 is aligned and connected with the e-liquid guiding hole 70 of the frame 33a so that the e-liquid chamber 50 is connected with the atomization core 30 to supply the e-liquid.

Referring to FIGS. 4-8, in a second exemplary embodiment of the present disclosure, the atomizer 100b is changed from the initial state to the usage state after the atomization core 30 with its installation position within the housing 20 is axially moved upward. That is to say, the e-liquid baffle 60 of the atomizer 100b is tightly fixed, and the atomization core 30 can move in the housing 20. Furthermore, the atomizer 100b is changed from the initial state to the usage state after the atomization core 30 is axially moved upwardly.

Figure 5:
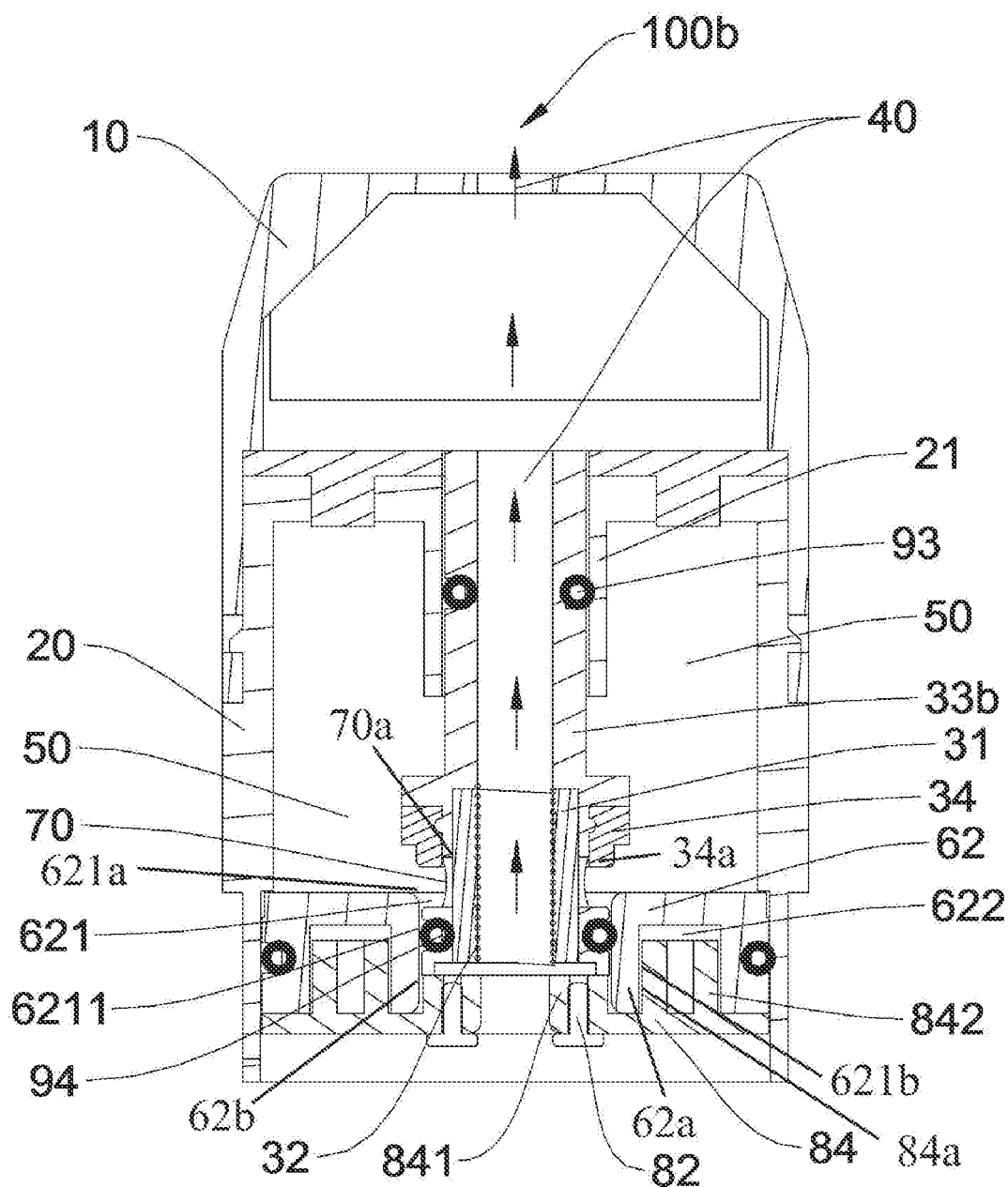
FIG. 5 is a cross-sectional schematic view of the atomizer of FIG. 4, shown the atomizer in its usage state.
Figure 6:
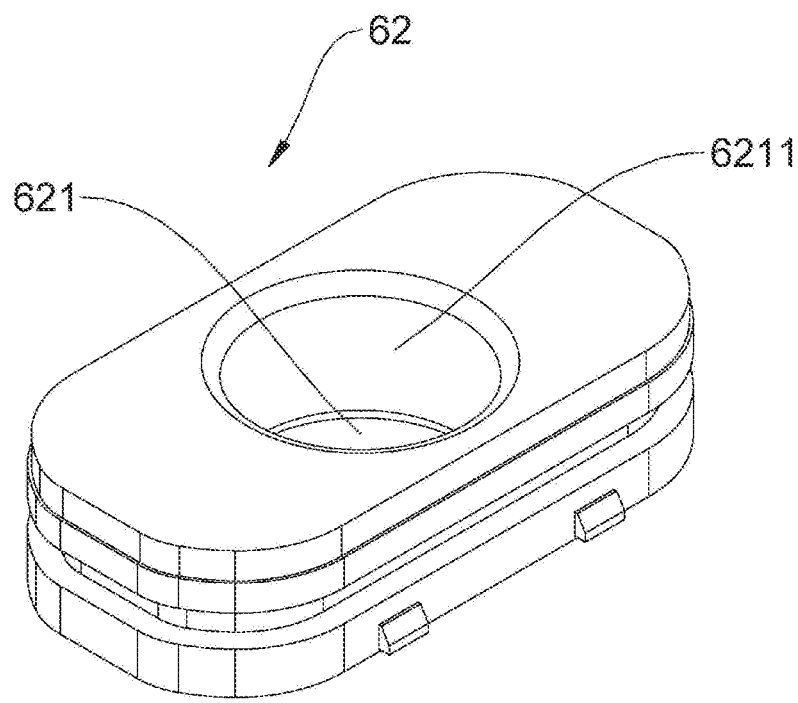
FIG. 6 is a schematic view of a second sealing cover of the atomizer of FIG. 4.
Figure 7:
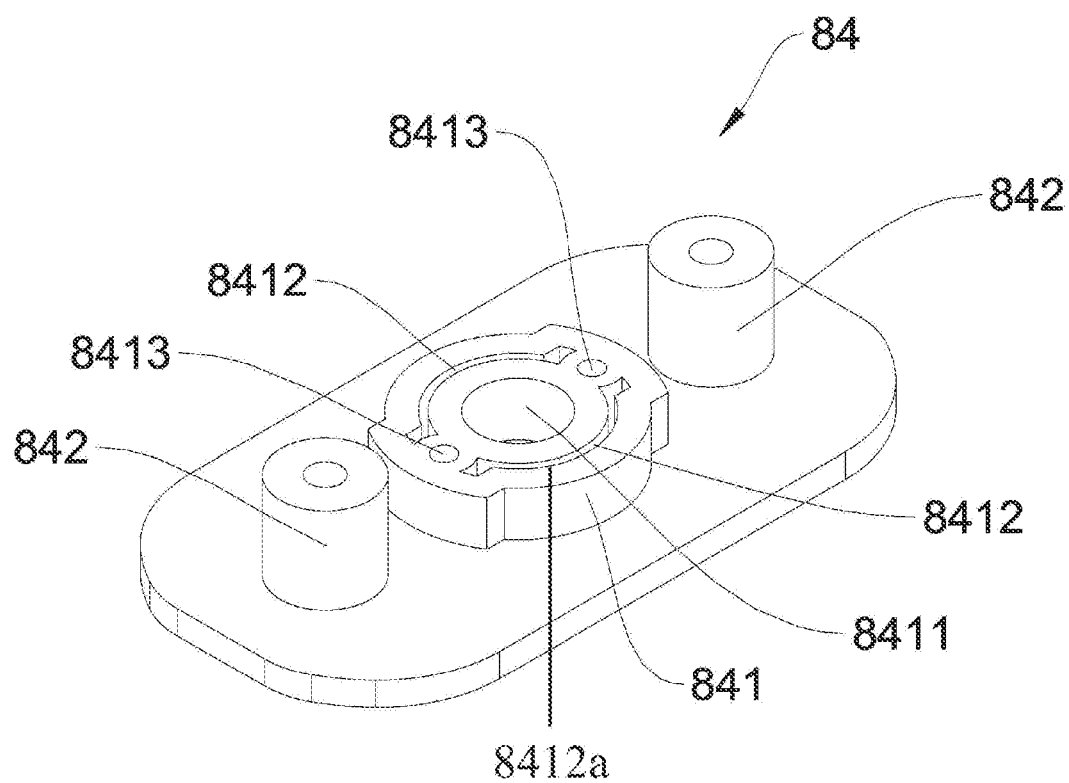
FIG. 7 is a schematic view of an isolating cover of the atomizer of FIG. 4.
Figure 8:
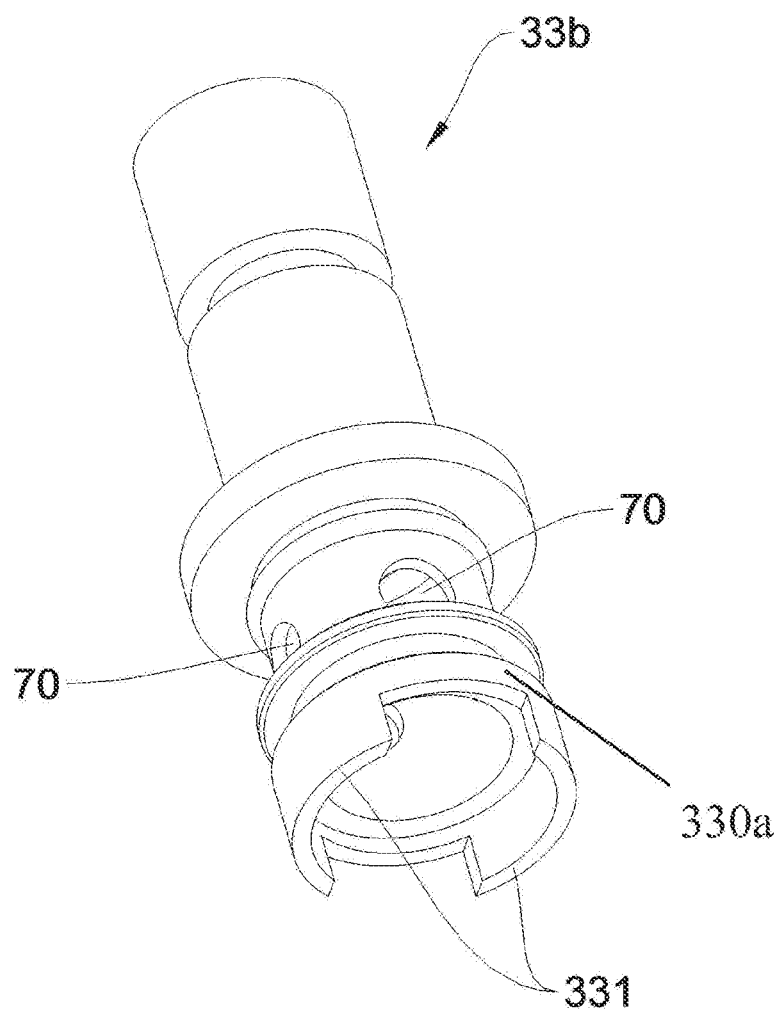
FIG. 8 is a schematic view of a frame of the atomizer of FIG. 4.

Specifically, referring to FIGS. 4-6, the housing 20 includes a hollow-shaped mounting seat 21 formed on the upper 20a thereof axially towards the housing 20, and a second sealing cover 62 is formed on the bottom 20b thereof to form the e-liquid baffle 60 and includes a second through-hole 621 axially passing therethrough. The atomization core 30 is received in the mounting seat 21 and the second through-hole 621 and then slid in the mounting seat 21 and the second through-hole 621.

When the atomizer 100b is in the initial state, the e-liquid guiding hole 70 is shielded by the inner wall 6211 of the second through-hole 621. Referring to FIG. 4, the e-liquid guiding hole 70 is within the second through-hole 621 so that it is shielded by the inner wall 6211.

The inner wall 6211 of the second through-hole 621 and the e-liquid guiding hole 70 are staggered up and down so that the atomizer 100b can change to the usage state after the atomization core 30 is moved in the mounting seat 21 and the second sealing cover 62 upwardly.

Referring to FIG. 5, under external forces, the atomization core 30 is moved upwardly relative to the sealing sleeve 611 until the e-liquid inlet 612 is staggered from the e-liquid guiding hole 70. At this time, the e-liquid guiding hole 70 is positioned above the second through-hole 621 and the e-liquid chamber 50 is connected with the e-liquid guiding hole 70 for supplying e-liquid to the atomization core 30, thereby the normal atomization of the atomization core 30 can be ensured.

Furthermore, in the second exemplary embodiment of the present disclosure, a sealing gasket 34 is sleeved around the atomization core 30 and positioned above the top end 70a of the e-liquid guiding hole 70, and its bottom 34a is extended into the second through-hole 621 when the atomizer 100b is on the initial state so that the e-liquid guiding hole 70 is disconnected from the e-liquid chamber 50 by the bottom 34a of the sealing gasket 34 and the inner wall 6211 of the second through-hole 621. The sealing gasket 34 is moved upward to separate from the second through-hole 621 after the atomization core 30 is moved in the mounting seat 21 and the second sealing cover 62 upwardly, and then the e-liquid guiding hole 70 is moved up to the top 621a of the second through-hole 621 to connect the e-liquid guiding hole 70 with the e-liquid chamber 50 and then the atomizer 100b is changed to the usage state. With the structure of the sealing gasket 34, when the atomizer 100b is in the initial state, the inner wall 6211 of the second through-hole 621 is shielded from the e-liquid guiding hole 70 to prevent the e-liquid in the e-liquid chamber 50 from flowing into the second through-hole 621 so that the e-liquid chamber 50 can be isolated from the atomization core 30.

Referring to FIG. 4, FIG. 5, FIG. 7 and FIG. 8, an insulating cover 84 is formed on the bottom 20b of the housing 20 and positioned below a lower end 62a of the second sealing cover 62, and includes a supporting seat 841 and a post 842 protruding outward thereof adjacent to a side 62b of the second sealing cover 62. The second sealing cover 62 includes a second moving chamber 622 formed on thereof adjacent to a side 84a of the insulating cover 84 and arranged on the outside 621b of the second through-hole 621. The post 842 is extended into the second chamber 622 to axially move therein, and the supporting seat 841 is resisted against the bottom 30b of the atomization core 30 and axially moving in the second through-hole 621. When the insulating cover 84 is pushed upward, the atomization core 30 is following to move upward via the insulating cover 84 and the post 842 is also moved upward in the second moving chamber 622, simultaneously.

Specifically, the supporting seat 841 includes a third through-hole 8411 formed in the middle thereof to pass through the insulating cover 84, and a first annular groove 8412 and a first electrode hole 8413 formed outside the third through-hole 8411 for the electrode 82 passing therethrough. The third through-hole 8411 is connected to the gas passage 40 from the bottom 30b of the atomization core 30. The atomization core 30 further includes a frame 33b defining the e-liquid guiding hole 70 formed on a sidewall 330 thereof, and an installing ring 331 formed on the bottom 330a thereof to insert into the first annular groove 8412 and then resist against the bottom 8412a of the first annular groove 8412. Due to the bottom 8412a of the first annular groove 8412 is resisted against the installing ring 331 of the frame 33b, when the insulating cover 84 is pushed upward, the atomization core 30 can move upward under the force of the insulating cover 84 until the atomizer 100b moves from the initial state to the usage state.

In the second exemplary embodiment of the present disclosure, a third sealing ring 93 is sleeved around the top 330b of the frame 33b to seal the mounting seat 21, and a fourth sealing ring 94 is sleeved around the bottom 70b of the e-liquid guiding hole 70 to tightly engage with the second through-hole 621. The e-liquid chamber 50 is sealed by the third sealing ring 93, the fourth sealing ring 94 and the second sealing cover 62, and an installation groove is formed on the frame 33b at a corresponding installation position of the third sealing ring 93 and the fourth sealing ring 94.

Referring to FIGS. 9-13, in a third exemplary embodiment of the present disclosure, the atomizer 100c is changed from the initial state to the usage state after the e-liquid baffle 60 with its installation position within the housing 20 is axially moved upward. That is to say, the atomization core 30 in the third exemplary embodiment of the present disclosure is tightly fixed, and the e-liquid baffle 60 can move in the housing 20. Furthermore, the atomizer 100c is changed from the initial state to the usage state after the e-liquid baffle 60 is axially moved upwardly.

Specifically, referring to FIGS. 9-12, the housing 20 includes a hollow-shaped mounting seat 21 formed on the upper 20a thereof axially towards the housing 20. An e-liquid baffle frame 63 is formed in the e-liquid chamber 50 to form the e-liquid baffle 60 and includes a sleeve 631 and a pin 632 formed on the bottom of the sleeve 631, and a third sealing cover 85 is formed on the bottom 20b of the housing 20 to connect with the bottom 30b of the atomization core 30 and includes a fourth through-hole 851 axially passing therethrough and connecting with the gas passage 40 from the bottom 30b of the atomization core 30, and a moving hole 852 formed outside the fourth through-hole 851. The pin 632 is inserted into the moving hole 852 to snap with the moving hole 852. The atomization core 30 is received in the mounting seat 21 and the sleeve 631 so that the sleeve 631 can move relative to the atomization core 30 and the pin 632 can move in the moving hole 852. In the exemplary embodiment of the present disclosure, the pin 632 is connected with the moving hole 852 by interference fit to prevent e-liquid leakage from the e-liquid chamber 50.

The e-liquid guiding hole 70 is shielded by the sleeve 631 when the atomizer 100c is in the initial state. Referring to FIG. 9, the e-liquid guiding hole 70 is within the sleeve 631 to be shielded.

The sleeve 631 and the e-liquid guiding hole 70 are staggered up and down so that the atomizer 100c can change to the usage state after the sleeve 631 is moved in the e-liquid chamber 50 upwardly.

Figure 10:
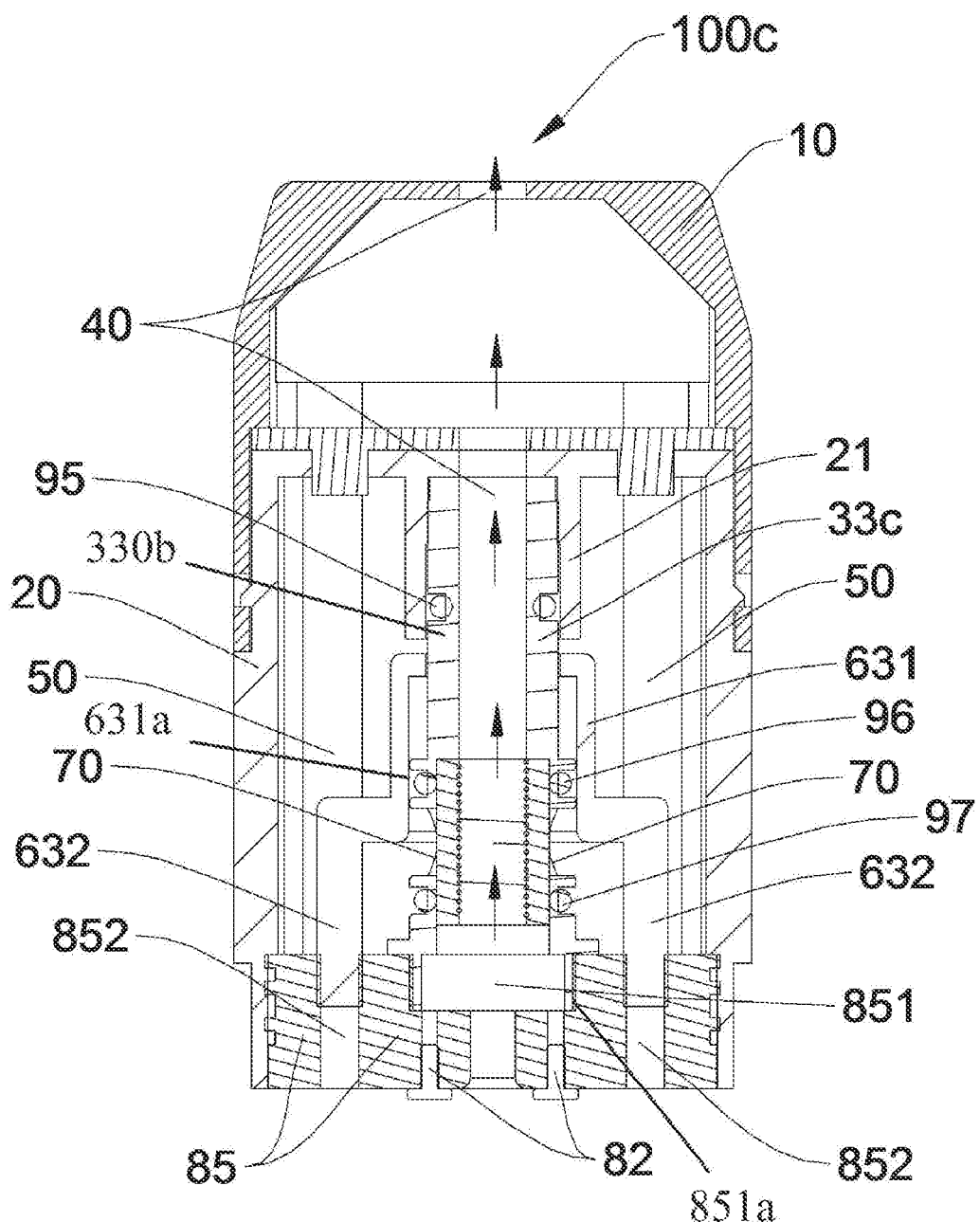
FIG. 10 is a cross-sectional schematic view of the atomizer of FIG. 9, shown the atomizer in its usage state.

Referring to FIG. 10, under external force, the pin 632 is moved upwardly in the moving hole 852, and the sleeve 631 is moved upwardly relative to the atomization core 30 until the sleeve 631 is staggered from the e-liquid guiding hole 70. At this time, the sleeve 631 of the e-liquid baffle frame 63 is positioned above the top 70a of the e-liquid guiding hole 70 and the e-liquid chamber 50 is connected with the e-liquid guiding hole 70 for supplying e-liquid to the atomization core 30, thereby the normal atomization of the atomization core 30 can be ensured.

Figure 11:
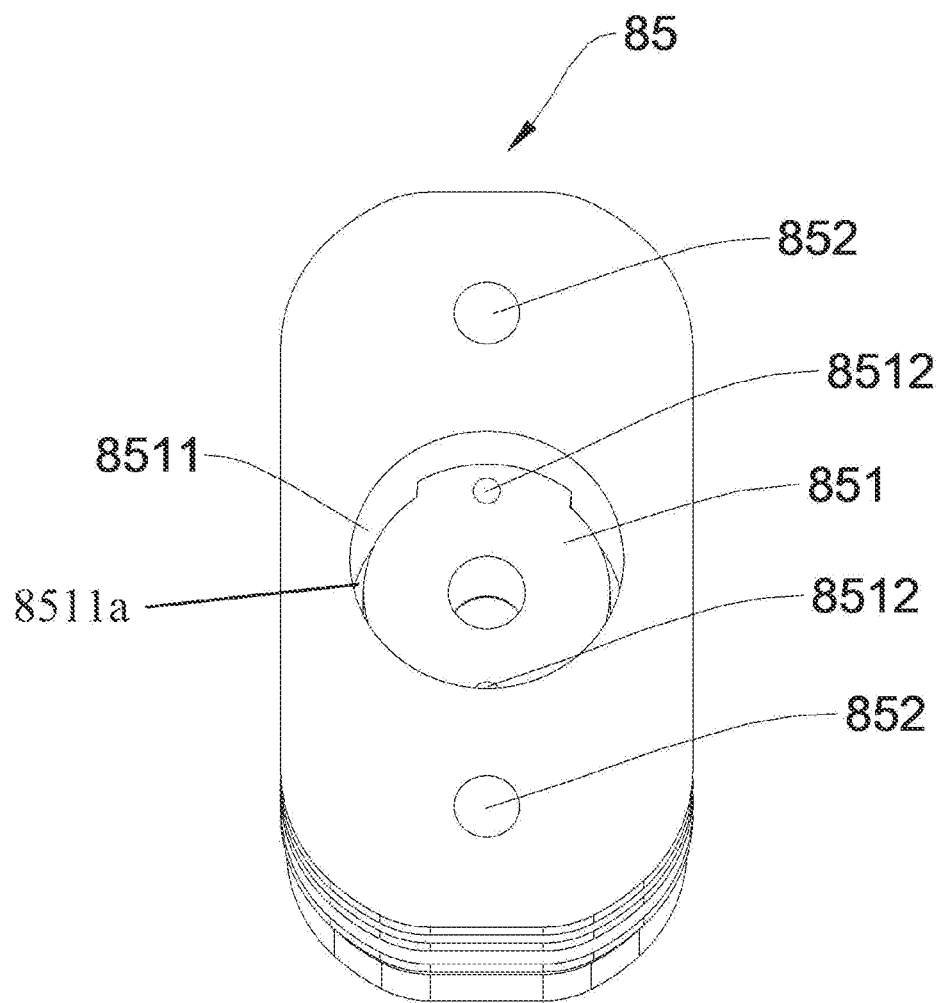
FIG. 11 is a schematic view of a third sealing cover of the atomizer of FIG. 9.
Figure 12:
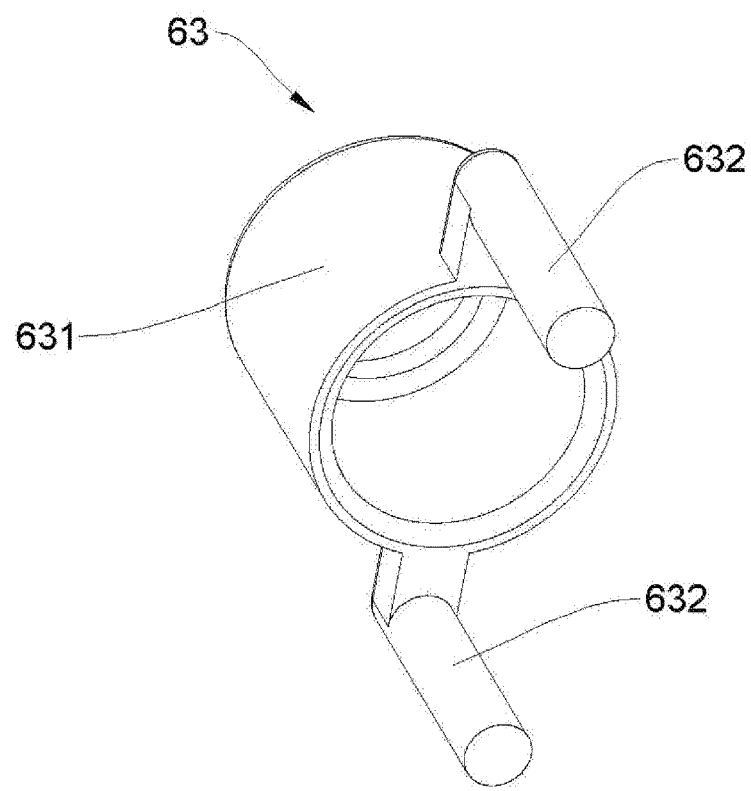
FIG. 12 is a schematic view of an e-liquid baffle frame of the atomizer of FIG. 9.
Figure 13:
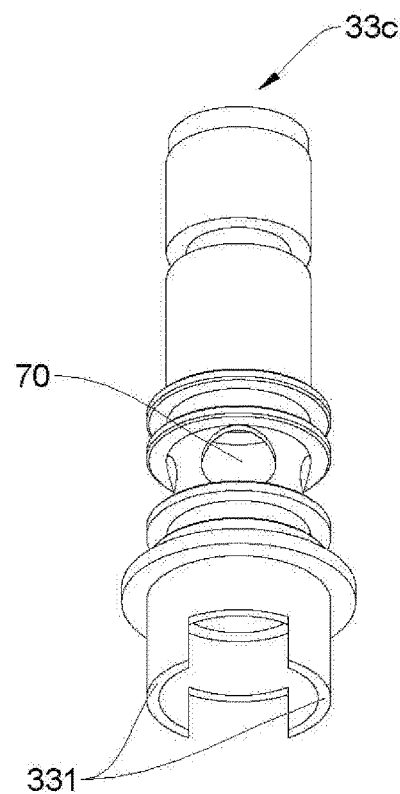
FIG. 13 is a schematic view of a frame of the atomizer of FIG. 10.

Referring to FIG. 11 and FIG. 13, the third sealing cover 85 includes a second annular groove 8511 formed on the inner wall 851b of the fourth through-hole 851 adjacent to the e-liquid chamber 50. The atomization core 30 further includes a frame 33c defining an installing ring 331 formed on the bottom 330a thereof and the e-liquid guiding hole 70 is formed on a sidewall 330 thereof. The installing ring 331 is inserted into the second annular groove 8511 and then resisted against the bottom 8511a of the second annular groove 8511. The third sealing cover 85 includes a second electrode hole 8512 formed on the outer 851a of the fourth through-hole 851 for the electrode 82 passing therethrough. Due to the bottom 8511a of the second annular groove 8511 is resisted against the installing ring 331, thereby the installing ring 331 can insert into the second annular groove 8511 to reliably connect the atomization core 30 and the third sealing cover 85.

Furthermore referring to FIG. 9 and FIG. 10, a fifth sealing ring 95 is sleeved around the top 330b of the frame 33c to seal the mounting seat 21, and a sixth sealing ring 96 and a seventh sealing ring 97 are respectively sleeved around the top 70a and the bottom 70b of the e-liquid guiding hole 70 to tightly engage with the inner wall 631a of the sleeve 631. Both the fifth sealing ring 95 and the third sealing cover 85 are configured to seal the overall e-liquid chamber 50. When the atomizer 100c is in the initial state, the sleeve 631 is connected with the e-liquid chamber 50 to prevent the e-liquid enter into the e-liquid guiding hole 70 within the sleeve 631. An installation groove is formed on the frame 33c at a corresponding installation position of the fifth sealing ring 95, the sixth sealing ring 96 and the seventh sealing ring 97.

The suction device 300 according to an exemplary embodiment of the present disclosure includes the atomizer 100a, 100b, 100c isolated an e-liquid chamber 50 thereof described above, and a battery rod 200 connected to the bottom 101 of the atomizer 100a, 100b, 100c.

Figure 14:
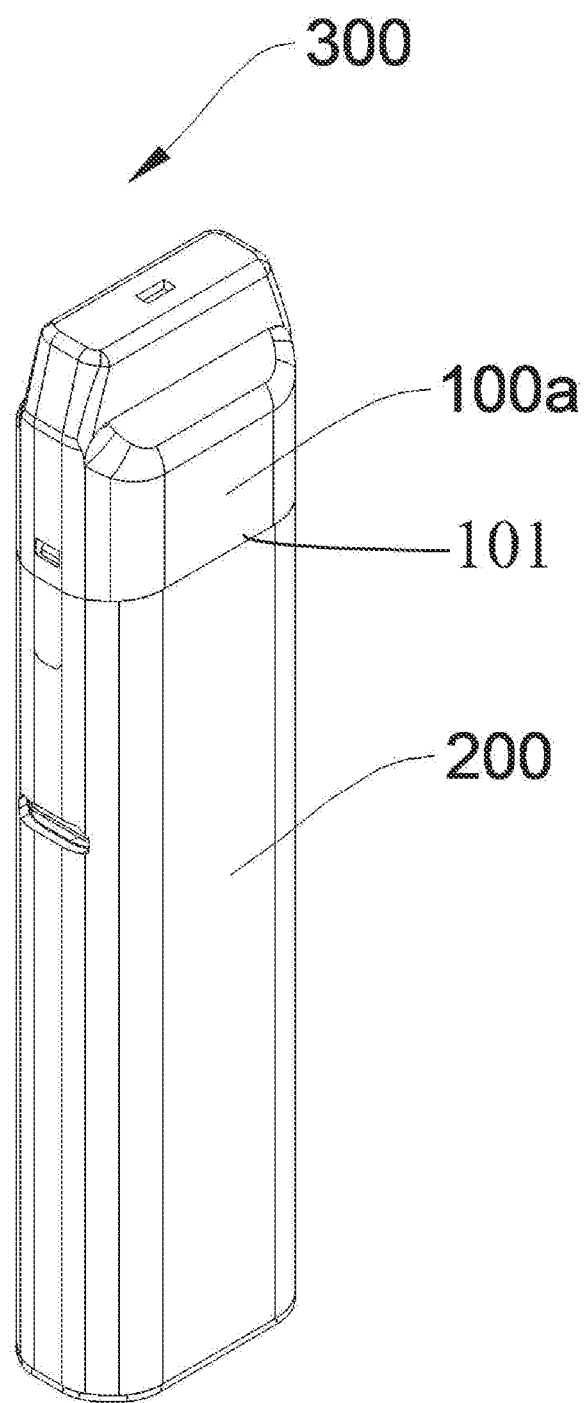
FIG. 14 is a schematic view of the suction device in accordance with a first exemplary embodiment.

Specifically, referring to FIG. 14, the suction device 300 includes the atomizer 100a shown in the first exemplary embodiment of the present disclosure, and the battery rod 200 connected to the bottom 101 of atomizer 100a. Due to the atomizer 100a isolated from the e-liquid chamber 50, the suction device 300 with the atomizer 100a can be set to an initial state and a usage state. In the initial state, the e-liquid chamber 50 is isolated from the atomization core 30, which can allow for transportation without e-liquid leakage, thereby avoiding the phenomenon of e-liquid leakage caused by the suction device 300 after its transportation is produced to further affect user's experience. After completing transportation of the suction device 300, the e-liquid chamber 50 can be connected with the atomization core 30 under external force to further set the atomizer in its usage state.

The atomizer 100a, 100b, 100c isolated an e-liquid chamber thereof the suction device 300 using same of the present disclosure is provided that an e-liquid baffle 60 is within the e-liquid chamber 50, and the atomization core 30 or the e-liquid baffle 60 with an installation position within the housing 20 can move in the housing 20 so that the e-liquid baffle 60 can be blocked or staggered from the e-liquid guiding hole 70. When the e-liquid guiding hole 70 is shielded by the e-liquid baffle 60, the e-liquid guiding hole 70 is disconnected from the e-liquid chamber 50 and the atomizer 100a, 100b, 100c is in its initial state. While, when the e-liquid guiding hole 70 is staggered from the e-liquid baffle 60, the e-liquid guiding hole 70 is connected with the e-liquid chamber 50 so that the atomizer 100a, 100b, 100c is in its usage state. In this way, when the atomizer is in the initial state, the e-liquid chamber 50 is isolated from the atomization core 30 so that the suction device 300 with the atomizer 100a, 100b, 100c can allow for transportation without e-liquid leakage. When needing to use the suction device 300, it is only to move away the atomization core 30 or the e-liquid baffle 60 to connect the atomization core 30 with the e-liquid chamber 50, thereby avoiding the phenomenon of e-liquid leakage caused by the suction device 300 after its transportation is produced to further affect user's experience.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An atomizer with an e-liquid chamber isolated thereof comprising:
a housing;
a mouthpiece mounted on the upper of the housing;
an atomization core received in the housing and comprising an e-liquid guiding hole thereon;
both the housing and the mouthpiece connected to the atomization core to form a gas passage thereamong;
the e-liquid chamber formed inside the housing and surrounded around the atomization core;
an e-liquid baffle formed between the e-liquid chamber and the atomization core inside the housing; and
wherein
an installation position of the atomization core or an installation position of the e-liquid baffle within the housing can move in the housing so that the e-liquid baffle can be blocked or staggered from the e-liquid guiding hole, when the e-liquid guiding hole is shielded by the e-liquid baffle, the e-liquid guiding hole is disconnected from the e-liquid chamber and the atomizer is in an initial state; while when the e-liquid guiding hole is staggered from the e-liquid baffle, the e-liquid guiding hole is connected with the e-liquid chamber so that the atomizer is in an usage state; and wherein the atomizer is changed from the initial state to the usage state after the installation position of the atomization core within the housing is axially moved downward.

2. The atomizer as claimed in claim 1, wherein the housing comprises a hollow-shaped mounting seat formed on the upper thereof axially towards the housing, and a first sealing cover formed on the bottom thereof to form the e-liquid baffle and comprising a sealing sleeve extending into the e-liquid chamber, with an e-liquid inlet on a sidewall of the sealing sleeve, the atomization core received in the mounting seat and the sealing sleeve and then slid in the mounting seat and the sealing sleeve; the e-liquid inlet is staggered from the e-liquid guiding hole when the atomizer is in the initial state, the e-liquid inlet aligned and connected with the e-liquid guiding hole so that the atomizer can change to the usage state after the atomizer is moved in the mounting seat and the sealing sleeve downwardly.

3. The atomizer as claimed in claim 2, wherein a pressing block is formed on the mouthpiece to resist against the upper end of the atomization core, a first recess and a second recess downwardly formed on two ends of the mouthpiece which are sleeved around two sides of the housing in turn, and a first block and a second block respectively formed on the outer wall of the housing in turn; in the initial state, a first moving chamber arranged between the pressing block and the upper of the housing and, the second recess engaged with the first block; when the atomization core moving downward to the usage state, the pressing block moving downward to resist against the bottom of the first moving chamber, the second recess moving downward to snap with the second block, and the first recess moving downward to snap with the first block.

4. The atomizer as claimed in claim 2, wherein the atomization core comprises an insulating gasket fainted on, the bottom of the atomization core and an electrode passing through the insulating gasket; a base formed on the bottom of the housing and positioned under the first sealing cover, with a first through-hole axially being formed thereof, the bottom of the atomization core and the insulating gasket extending into the base, an air inlet channel formed between the base and the housing to connect with the gas passage from the bottom of the atomization core; the atomization core tightly fixed with the mounting seat and the sealing sleeve, a first sealing ring formed on a connection end of the upper of the atomization core and the mounting seat, a second sealing ring sleeved around the outer of the insulating gasket and moved downward to the first through-hole of the base to tightly connect with the base.

5. The atomizer as claimed in claim 1, wherein the atomizer is changed from the initial state to the usage state after the installation position of the atomization core within the housing is axially moved upward.

6. The atomizer as claimed in claim 5, wherein the housing includes a hollow-shaped mounting seat formed on the upper thereof axially towards the housing, and a second sealing cover formed on the bottom thereof to form the e-liquid baffle and comprising a second through-hole axially passing therethrough, the atomization core received in the mounting seat and the second through-hole and then slid in the mounting seat and the second through-hole; the e-liquid guiding hole is shielded by the inner wall of the second through-hole when the atomizer is in the initial state, the inner wall of the second through-hole and the e-liquid guiding hole are staggered up and down so that the atomizer can change to the usage state after the atomization core is moved in the mounting seat and the second sealing cover upwardly.

7. The atomizer as claimed in claim 6, wherein a sealing gasket is sleeved around the atomization core and positioned above the e-liquid guiding hole, and its bottom is extended into the second through-hole when the atomizer is on the initial state so that the e-liquid guiding hole is disconnected from the e-liquid chamber by the bottom of the sealing gasket and the inner wall of the second through-hole; the sealing gasket moved upward to separate from the second through-hole after the atomization core moved in the mounting seat and the second sealing cover upwardly, and the e-liquid guiding hole moved upward to the top of the second through-hole to connect the e-liquid guiding hole with the e-liquid chamber and then the atomizer changed to the usage state.

8. The atomizer as claimed in claim 6, wherein an insulating cover is formed on the bottom of the housing and positioned below the second sealing cover, and comprises a supporting seat and a post protruding outward thereof adjacent to a side of the second sealing cover, the second sealing cover comprising a second moving chamber formed thereof adjacent to a side of the insulating cover and arranged outside the second through-hole; the post extending into the second chamber to axially move therein, and the supporting seat, resisted against the bottom of the atomization core and axially moving in the second through-hole; the supporting seat comprising a third through-hole formed in the middle thereof to pass through the insulating cover, and a first annular groove and a first electrode hole formed outside the third through-hole for the electrode passing therethrough, the third through-hole connected to the gas passage from the bottom of the atomization core, the atomization core comprising a frame defining the e-liquid guiding hole formed on a sidewall thereof, and an installing ring formed on the bottom thereof to insert into the first annular groove and then resist against the bottom of the first annular groove; a third sealing ring sleeved around the top of the frame to seal the mounting seat, and a fourth sealing ring sleeved around the bottom of the e-liquid guiding hole to tightly engage with the second through-hole.

9. The atomizer as claimed in claim 1, wherein the atomizer is changed from the initial state to the usage state after the installation position of the e-liquid baffle within the housing is axially moved upward.

10. The atomizer as claimed in claim 9, wherein the housing comprises a hollow-shaped mounting seat formed on the upper thereof axially towards the housing, and an e-liquid baffle frame formed thereof to form the e-liquid baffle and comprising a sleeve and a pin formed on the bottom of the sleeve, a third sealing cover formed on the bottom of the housing to connect with the bottom of the atomization core and comprising a fourth through-hole axially passing therethrough and connecting with the gas passage from the bottom of the atomization core, and a moving hole formed outside the fourth through-hole, the pin inserted into the moving hole to snap with the moving hole and the atomization core received in the mounting seat and the sleeve so that the sleeve can move relative to the atomization core and the pin can, move in the moving hole; the e-liquid hole shielded by the sleeve when the atomizer is in the initial state, while the sleeve and the e-liquid guiding hole are staggered up and down so that the atomizer can change to the usage state after the sleeve is moved in the e-liquid chamber upwardly.

11. The atomizer as claimed in claim 10, wherein the third sealing cover comprises a second annular groove formed on the inner wall of the fourth through-hole adjacent to the e-liquid chamber, and the atomization core comprises a frame defining an installing ring formed on the bottom thereof and the e-liquid guiding hole formed on a sidewall thereof, the installing ring inserting into the second annular groove and then resisted against the bottom of the second annular groove, the third sealing cover comprising a second electrode hole formed on the outer of the fourth through-hole for the electrode passing therethrough; a fifth sealing ring sleeved around the top of the frame to seal the mounting seat, and a sixth sealing ring and a seventh sealing ring respectively sleeved around the top and the bottom of the e-liquid guiding hole to tightly engage with the inner wall of the sleeve.

12. A suction device comprising an atomizer with an e-liquid chamber isolated thereof, and a battery rod connected to the bottom of the atomizer, the atomizer with an e-liquid chamber isolated thereof comprising:
  a housing;
  a mouthpiece mounted on the upper of the housing;
  an, atomization core received in the housing and comprising an e-liquid guiding hole thereon;
  both the housing and the mouthpiece connected to the atomization core to form a gas passage thereamong;
  the e-liquid chamber formed inside the housing and surrounded around the atomization core;
  an e-liquid baffle formed between the e-liquid chamber and the atomization core inside the housing; and
  wherein
  an installation position of the atomization core or an installation position of the e-liquid baffle within the housing can move in the housing so that the e-liquid baffle can be blocked or staggered from the e-liquid guiding hole, when the e-liquid guiding hole is shielded by the e-liquid baffle, the e-liquid guiding hole is disconnected from the e-liquid chamber and the atomizer is in an initial state; while when the e-liquid guiding hole is staggered from the e-liquid baffle, the e-liquid guiding hole is connected with the e-liquid chamber so that the atomizer is in an usage state; and wherein the atomizer is changed from the initial state to the usage state after the installation position of the atomization core within the housing is axially moved downward.

13. The suction device as claimed in claim 12, wherein the housing comprises a hollow-shaped mounting seat formed on the upper thereof axially towards the housing, and a first sealing cover formed on the bottom thereof to form the e-liquid baffle and comprising a sealing sleeve extending into the housing, with an e-liquid inlet on a sidewall of the sealing sleeve, the atomization core received in the mounting seat and the sealing sleeve and then slid in the mounting seat and the sealing sleeve; the e-liquid inlet is staggered from the e-liquid guiding hole when the atomizer is in the initial state, the e-liquid inlet aligned and connected with the e-liquid guiding hole so that the atomizer can change to the usage state after the atomizer is moved in the mounting seat and the sealing sleeve downwardly; a pressing block formed on the mouthpiece to resist against the upper end of the atomization core, a first recess and a second recess downwardly formed on two ends of the mouthpiece in turn, and a first block and a second block respectively formed on the outer wall of the housing which are sleeved around two sides of the housing in turn; in the initial state, a first moving chamber arranged between the pressing block and the upper of the housing and the second recess engaged with the first block; when the atomization core moving downward to the usage state, the pressing block moving downward to resist against the bottom of the first moving chamber, the second recess moving downward to snap with the second block, and the first recess moving downward to snap with the first block.

14. The suction device as claimed in claim 12, wherein the atomization core comprises an insulating gasket formed on the bottom of the atomization core and an electrode passing through the insulating gasket; a base formed on the bottom of the housing and positioned under the first sealing cover, with a first through-hole axially being formed thereof, the bottom of the atomization core and the insulating gasket extending into the base, an air inlet channel formed between the base and the housing to connect with the gas passage from the bottom of the atomization core; the atomization core tightly fixed with the mounting seat and the sealing sleeve, a first sealing ring, formed on a connection end of the upper of the atomization core and the mounting seat, a second sealing ring sleeved around the outer of the insulating gasket and moved downward to the first through-hole of the base to tightly connect with the base.

15. The suction device as claimed in claim 12, wherein the atomizer is changed from the initial state to the usage state after the installation position of the atomization core within the housing is axially moved upward; the housing comprising a hollow-shaped mounting seat formed on the upper thereof axially towards the housing, and a second sealing cover formed on the bottom thereof to form the e-liquid baffle and comprising a second through-hole axially passing therethrough, the atomization core received in the mounting seat and the second through-hole and then slid in the mounting seat and the second through-hole; the e-liquid guiding hole shielded by the inner wall of the second through-hole when the atomizer is in the initial state, the inner wall of the second through-hole and the e-liquid guiding hole staggered up and down so that the atomizer can change to the usage state after the atomization core is moved in the mounting seat and the second sealing cover upwardly; a sealing gasket sleeved around the atomization core and positioned above the e-liquid guiding hole and the bottom of the sealing gasket extending into the second through-hole when the atomizer in the initial state so that the e-liquid guiding hole is disconnected from the e-liquid chamber by the bottom of the sealing gasket and the inner wall of the second through-hole; the sealing gasket moved upward to separate from the second through-hole after the atomization core moved in the mounting seat and the second sealing cover upwardly, and the e-liquid guiding hole moved upward to the top of the second through-hole to connect the e-liquid guiding hole with the e-liquid chamber and then the atomizer changed to the usage state.

16. The suction device as claimed in claim 12, wherein the atomizer is changed from the initial state to the usage state after the atomization core with its installation position within the housing is axially moved upward; the housing comprising a hollow-shaped mounting seat formed on the upper thereof axially towards the housing, and a second sealing cover formed on the bottom thereof to form the e-liquid baffle and comprising a second through-hole axially passing therethrough, the atomization core received in the mounting seat and the second through-hole and then slid in the mounting seat and the second through-hole; the e-liquid guiding hole shielded by the inner wall of the second through-hole when the atomizer is in the initial state, the inner wall of the second through-hole and the e-liquid guiding hole staggered up and down so that the atomizer can change to the usage state after the atomization core is moved in the mounting seat and the second sealing cover upwardly; an insulating cover formed on the bottom of the housing and positioned below the second sealing cover, and comprising a supporting seat and a post outwardly protruding adjacent to a side of the second sealing cover, the second sealing cover comprising a second moving chamber formed adjacent to the insulating cover and arranged outside the second through-hole; the post extending into the second chamber to axially move therein, and the supporting seat resisted against the bottom of the atomization core and axially moving in the second through-hole; the supporting seat comprising a third through-hole formed in the middle thereof to pass through the insulating cover, and a first annular groove and a first electrode hole formed outside the third through-hole for the electrode passing therethrough, the third through-hole connected to the gas passage from the bottom of the atomization core, the atomization core comprising a frame defining the e-liquid guiding hole formed on a sidewall thereof, and an installing ring formed on the bottom thereof to insert into the first annular groove and then resist against the bottom of the first annular groove; a third sealing ring sleeved around the top of the frame to seal the mounting seat, and a fourth sealing ring sleeved around the bottom of the e-liquid guiding hole to tightly engage with the second through-hole.

17. The suction device as claimed in claim 12, wherein the atomizer is changed from the initial state to the usage state after the installation position of the e-liquid baffle within the housing is axially moved upward; the housing comprising a hollow-shaped mounting seat formed on the upper thereof axially towards the housing, and an e-liquid baffle frame formed thereof to form the e-liquid baffle and comprising a sleeve and a pin formed on the bottom of the sleeve, a third sealing cover formed on the bottom of the housing to connect with the bottom of the atomization core and comprising a fourth through-hole axially passing therethrough and connecting with the gas passage from the bottom of the atomization core, and a moving, hole formed outside the fourth through-hole, the pin inserted into the moving hole to snap with the moving hole and the atomization core received in the mounting seat and the sleeve so that the sleeve can move relative to the atomization core and the pin can move in the moving hole; the e-liquid hole shielded by the sleeve when the atomizer is in the initial state, while the sleeve and the e-liquid guiding hole staggered up and down so that the atomizer can change to the usage state after the sleeve moved in the e-liquid chamber upwardly.

18. The suction device as claimed in claim 17, wherein the third sealing cover comprises a second annular groove formed on the inner wall of the fourth through-hole adjacent to the e-liquid chamber, and the atomization core comprises a frame defining an installing ring formed on the bottom thereof and the e-liquid guiding hole formed on a sidewall thereof, the installing ring inserting into the second annular groove and then resisted against the bottom of the second annular groove, the third sealing cover comprising a second electrode hole formed on the outer of the fourth through-hole for the electrode passing therethrough; a fifth sealing ring sleeved around the top of the frame to seal the mounting seat, and a sixth sealing ring and a seventh sealing ring respectively sleeved around the top and the bottom of the e-liquid guiding hole to tightly engage with the inner wall of the sleeve.

* * * * *